Feb. 12, 1935.  W. L. HAWKINS  1,991,208
SPARE WHEEL OR TIRE LOCK
Original Filed Sept. 24, 1928
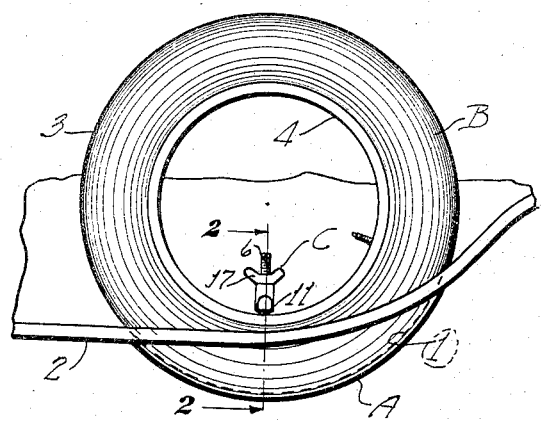
Fig. 1.
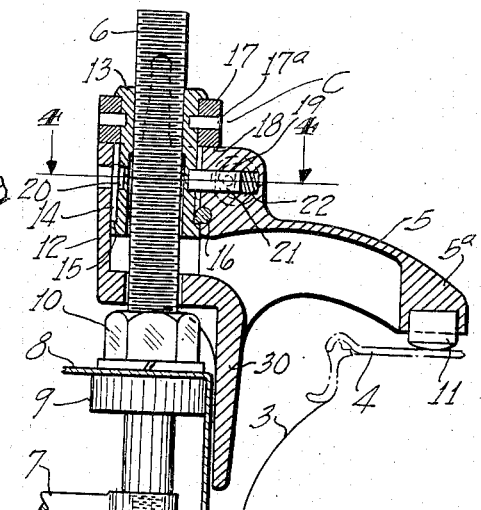
Fig. 2.
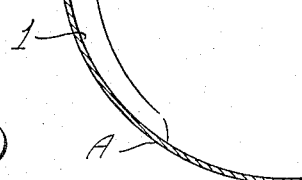
Fig. 3.
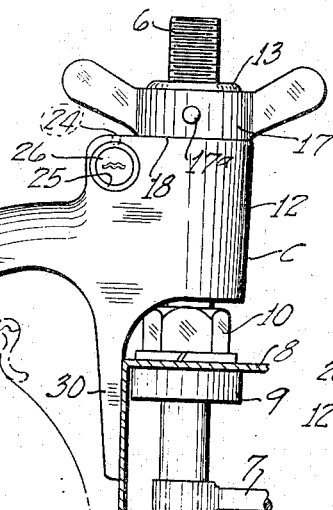
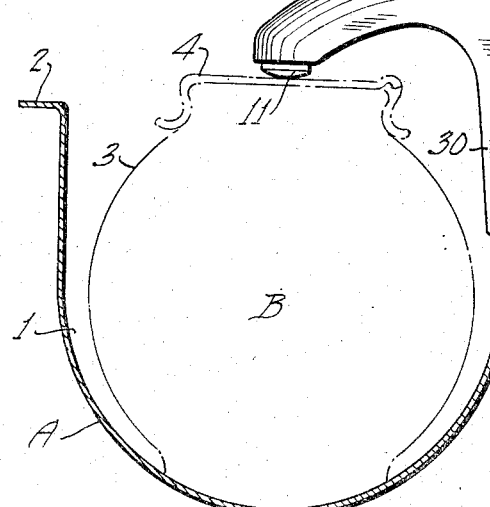
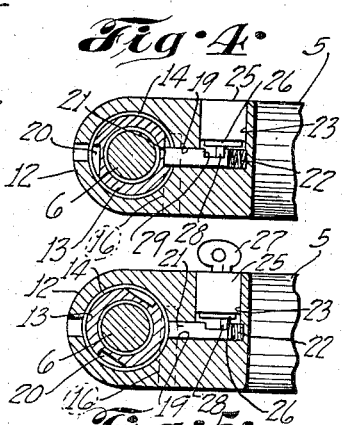
Fig. 4.
Fig. 5.
INVENTOR
Walter L. Hawkins.
BY Ralph Karrish
ATTORNEY Patented Feb. 12, 1935

1,991,208

UNITED STATES PATENT OFFICE 1,991,208

SPARE WHEEL OR TIRE LOCK

Walter L. Hawkins, St. Louis, Mo., assignor, by mesne assignments, to Oakes Products Corporation, Detroit, Mich., a corporation of Michigan Application September 24, 1928, Serial No. 307,887
Renewed September 26, 1932

1 Claim. (Cl. 70—90)

This invention relates generally to locks for automobile spare parts.

Many automobiles of present standard construction are equipped with spare wheels or tires which are carried upon the fenders. For such purpose, the fenders are provided with what are commonly designated as "wells", which may hence be described as tire supports or carriers embodied or incorporated in the automobile or other like vehicle and commonly include a U-shaped pocket or recess adapted for treadwise partial reception of a spare-tire or wheel assembly.

My present invention has particular reference to a device for lockably retaining a spare tire or wheel assembly in such a so-called "fender well" of an automobile or other vehicle and has for its chief object the provision of a device for efficiently locking such spare-wheel or tire against unauthorized removal.

My invention has for a further object the provision of such a locking device which comprises few parts, which may be readily and inexpensively manufactured, which may be easily installed upon the automobile or other vehicle, which is compact and durable in structure, which is conveniently operable, and which is efficient in the performance of its intended functions.

And with the above and other objects in view, my present invention resides in the novel features of form, construction, arrangement, and combination of parts hereinafter described and pointed out in the claim.

In the accompanying drawing,

Figure 1 is a fragmentary side view of a fender having a well or tire-support incorporated therein, in association with a spare wheel or tire assembly treadwise presented therein and lockably retained by a lock embodying my invention;

Figure 2 is a fragmentary sectional view along the line 2—2, Figure 1, a portion of the wheel or tire-assembly being shown by dot-and-dash lines;

Figure 3 is an elevational view of the lock, fragmentary portions of the fender and supporting bracket being shown and a wheel or tire assembly being indicated by dot-and-dash lines;

Figure 4 is a sectional view along the line 4—4, Figure 2, showing the ratchet nut of the lock in locked position; and Figure 5 is a view similar to Figure 4, showing the ratchet-nut of the lock in unlocked position.

Referring now more in detail and by reference characters to the drawing, which illustrates a preferred embodiment of the invention, A designates a tire-support of the type known as a "fender-well", which includes an arcuate pocket or recess 1 formed preferably with a U-shaped or other cross-section, conformable with the contour of the standard tire, in the usual fender 2 of an automobile or other vehicle, for the partial treadwise reception of a spare-tire or wheel assembly B. This latter usually comprises a casing 3 and its associated so-called "demountable" rim or wheel, whether wire, disc, or artillery, 4, as best seen in Figure 1; for brevity, the same will be designated both in this specification and in the claims as the spare-wheel assembly.

My new lock, designated generally as C, is adapted to prevent the unauthorized removal of the spare-wheel assembly B from the tire support A by lockably interposing a linearly movable retaining member or arm 5 in spaced relation with the support A for embracing the assembly B therebetween, as shown in Figure 3, arm 5 being supported for movement in a radial plane of the wheel-assembly B towards or away from the support A on an adjacent screw-threaded post 6 supported on a fixed bracket 7 extended laterally from the frame or other portion of the chassis of the vehicle (not shown). The post 6 preferably projects upwardly through the apron 8 of the fender 2 and is secured thereto by a collar 9 abutting the under side of the apron and a nut 10 threaded to the post for bearing on the upper side of the apron.

The arm 5, which for the most part is preferably of inverted channel shape in cross-section, as best seen in Figure 2, terminates in a nose 5a carrying a wheel or rim-engaging cushion or pad 11 and includes a tubular or chambered body-portion 12 encircling and disposed for movement upon and relatively to the post 6, and disposed in the bore or chamber of the arm body-portion 12 and threaded to the post 6, is a ratchet-nut 13 provided with a circumferential annular channel 14, co-operating with the lower wall 15 of which and fixed transversely in the arm 5, is a pin 16 for permanently, while permitting rotatory movement of the nut 13 relatively to the arm 5 and also rotatory or swinging movement of arm 5 relatively to the nut 13, retaining the nut 13 and arm 5 operatively together.

Pinned or otherwise permanently fastened or conjoined, as at 17a, to the nut 13, is a handled collar or ring 17 adapted to revolvingly bear against the upper or outer face 18 of the arm body-portion 12, whereby the nut 13 may be rotated for adjustment on the post 6, the arm 5 being thereby moved or shifted towards or away from the support A.

Reciprocable in a bore 19 in the arm body-portion 12 for co-operative latching engagement with a series of ratchet teeth or notches 20 provided on the nut 13, is a bolt 21 normally urged yieldingly in extended or projected position by a spring 22 seated between the end wall of the bore 19 and the bolt 21.

Disposed in a recess 23 provided in the arm body-portion 12 and pinned, as at 24, or otherwise permanently fixed to the arm 5 against removal, is a preferably cylindrical lock-block 25, mounted for rotatory movement in which is a cylindrical member or barrel 26 adapted only for rotatory actuation, as is customary in such locks, by means of a key 27 insertable into the cylinder 26. The barrel 26 at its inner end extends preferably somewhat beyond the block 25, and projecting from the inner end of barrel 26, is a longitudinally disposed and axially offset crank-pin 28 adapted to fit and work in a slot 29 provided in the spring-pressed bolt 21, the axial width of which slot is sufficient to permit lengthwise movement of the bolt 21 by the nut 13 in riding thereover either when key-actuated, as shortly appears, or when rotated in the direction opposite to that faced by the teeth or notches 20, for purposes presently appearing.

Preferably depending from the arm body-portion 12 for slidably bearing against a side wall of the well 1 or other like contiguous part of the support A, is a guide or stem 30 adapted to prevent rotation of the arm 5 on the post 6 when said arm is disposed for retention of the wheel assembly B on or in the support A. Preferably, however, the length of the stem 30 is such that the arm 5 may be swung about the post 6 away from the well 1 before the nut 13 is entirely disengaged from the post 6, thereby facilitating the use of the device, as shortly appearing.

Normally, as when the key 27 is removed from the lock-cylinder 26, the bolt 21 yieldingly engages the nut 13 at one or the other of its notches 20 and prevents rotatory movement of the nut 13 in the direction faced by the notches 20, or, as it may be said, outwardly upon the post 6 for freeing the wheel-assembly. However, manually or by means of a wrench or other suitable tool (not shown) applied upon the ring 17, the nut 13 may be rotarily actuated inwardly or in a wheel-locking direction upon the post 6, that is to say, in the direction opposite to that faced by the ratchet-notches 20, the bolt 21 being successively depressed against the tension of spring 22 by the cam faces of the several notches 20 and the nut 13 riding thereover, the slot 29 being, as stated, of sufficient length or width to permit such successive depression against the tension of spring 22 when the nut 13 is so actuated inwardly. On a key 27 being inserted in the cylinder 26 and the cylinder 26 being then rotarily actuated, the bolt 21 will be pulled or retracted by the crank-pin 28 out of engagement with the nut 13, when the nut 13 may be freely rotated outwardly or in a wheel-freeing or release direction, the arm 5 and its stem 30 being thereby shifted away from the wheel assembly B and the fender 2.

Hence, in use and operation, the key 27 is suitably manipulated to retract the bolt 21 against the tension of spring 22 and unlatch the nut 13, which may then be rotated by manually or otherwise grasping the handled collar 17 to adjust the nut 13 on the post 6 in a direction to move the arm 5 away from the support A, preferably until the stem 30 is disengaged from the wall of the well 1, whereupon the arm 5 may be swung about the post 6 to clear the well 1 of the support A. The wheel-assembly B is then treadwise presented in the well 1 and the arm 5 swung thereover. The key 27 meanwhile having been removed to permit the bolt 21 to take its normally spring set position, the nut 13 is screwed down on the post 6 until the arm 5 engages the rim 4 and firmly holds the tire assembly on or in the support A, the stem 30 engaging the support A and thereby rigidly retaining the arm 5 against swingable movement relatively to the arm 5 and post 6 and the bolt 21 engaging a ratchet tooth or notch 20 of the nut 13 to prevent retrograde movement thereof, thereby locking the wheel assembly B on the support A.

It is to be understood that changes in the form, construction, arrangement, and combination of the several parts of my new lock may be made and substituted for those herein shown and described without departing from the nature and principle of my invention.

Having thus described my invention, what I claim and desire to secure by Letters Patent is:

A lock for a tire and rim assembly comprising, in combination, a threaded post adapted for mounting on a support; an arm having a chambered portion fitting for movement about the post, a ratchet-nut disposed in said arm-portion and threaded for movement on the post, the arm and nut being secured together for movement as a unit lengthwise of the post for impinging engagement of the arm with the wheel-assembly, means for releasably locking the nut and arm against wheel-freeing movement on the post, said means including a spring-pressed key-retractable bolt carried by the arm and adapted for engagement with the nut, and a projection on the arm adapted for engagement with the support for retaining the arm against swinging-movement on the post when in wheel-locking position.

WALTER L. HAWKINS.